(No Model.)

S. W. ALLEN.
OPTICAL LANTERN.

No. 569,849.

3 Sheets—Sheet 1.

Patented Oct. 20, 1896.

Witnesses

Inventor
Samuel Wesley Allen
by Harold B. Binney
Attorney (No Model.) 3 Sheets—Sheet 2.
S. W. ALLEN.
OPTICAL LANTERN.

No. 569,849. Patented Oct. 20, 1896.

Witnesses
J. Landing
Geo. N. Sonneborn

Inventor
Samuel Wesley Allen
by Harold B. Pinney
Attorney (No Model.)  3 Sheets—Sheet 3.

S. W. ALLEN.
OPTICAL LANTERN.

No. 569,849. Patented Oct. 20, 1896.

Witnesses
J. Landsing
Geo. H. Sonneborn.

Inventor
Samuel Wesley Allen,
by Harold Binney
Attorney

UNITED STATES PATENT OFFICE.

SAMUEL WESLEY ALLEN, OF PORT CHESTER, NEW YORK.

OPTICAL LANTERN.

SPECIFICATION forming part of Letters Patent No. 569,849, dated October 20, 1896.

Application filed November 11, 1895. Serial No. 568,575. (No model.) Patented in England December 23, 1892, No. 23,756.

*To all whom it may concern:*

Be it known that I, SAMUEL WESLEY ALLEN, formerly of Cardiff, in the county of Glamorgan, England, and now of Port Chester, in the county of Westchester, New York, have invented a new and useful Improvement in Optical Lanterns, (for which I have obtained a patent in Great Britain, No. 23,756, of December 23, 1892,) of which the following is a description, referring to the accompanying drawings, which form a part of this specification.

The invention relates particularly to an apparatus for exhibiting lantern-slides in an optical lantern, and to an improved tap or valve for regulating oxygen and hydrogen gas supplies particularly adapted for use in an optical lantern.

The objects of the invention will be apparent from the description and operation of the apparatus; but among these objects may be mentioned particularly the ready removal of a slide after it has been exhibited, the insertion of the next slide during the exhibition of the preceding slide, the closing or partial obscuration of the lantern during the time the change of slide is taking place, and the regulation of the gas supply so that it may be turned off and on without requiring readjustment and regulation of the valves each time the gas is turned on.

To these and certain other purposes, which will hereinafter more fully appear, the invention is embodied in the apparatus constructed, arranged, combined, and used substantially in the manner hereinafter described, illustrated, and claimed.

Figure 1:
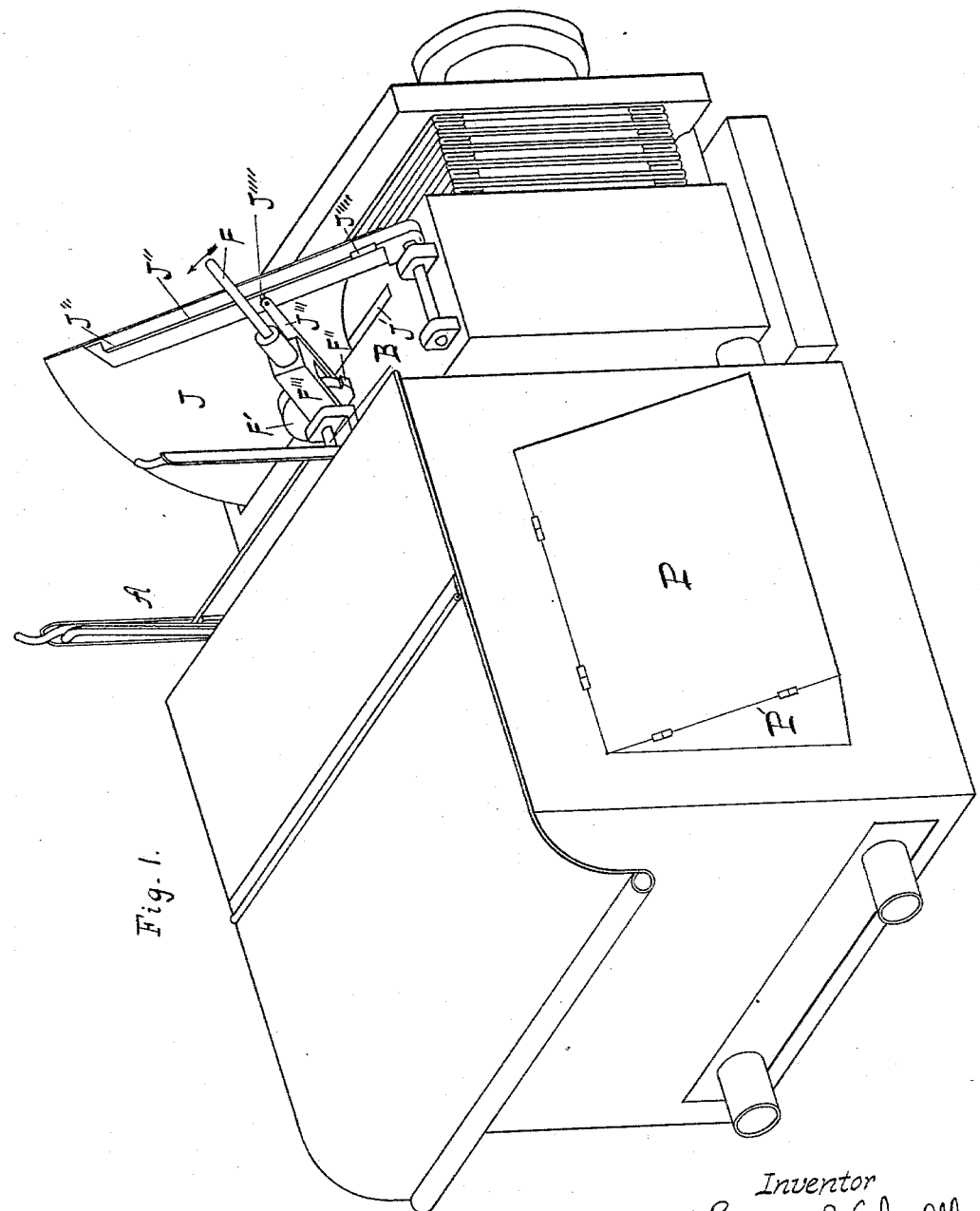
Figure 2:
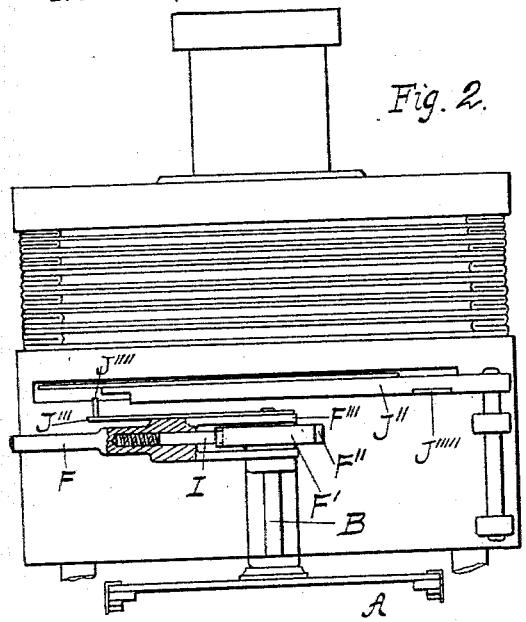
Figure 3:
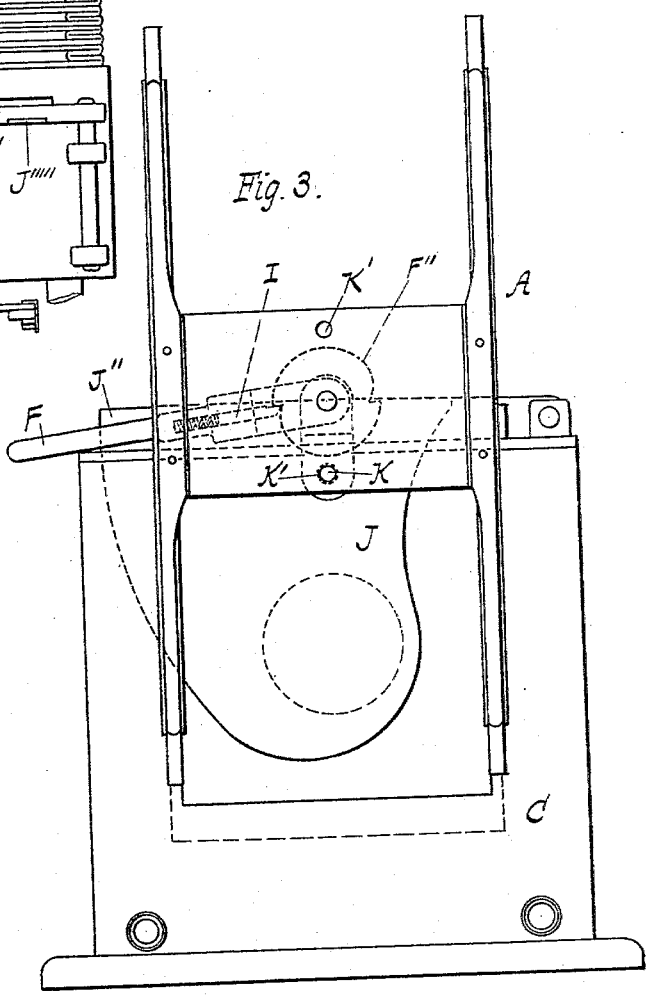
Figure 4:
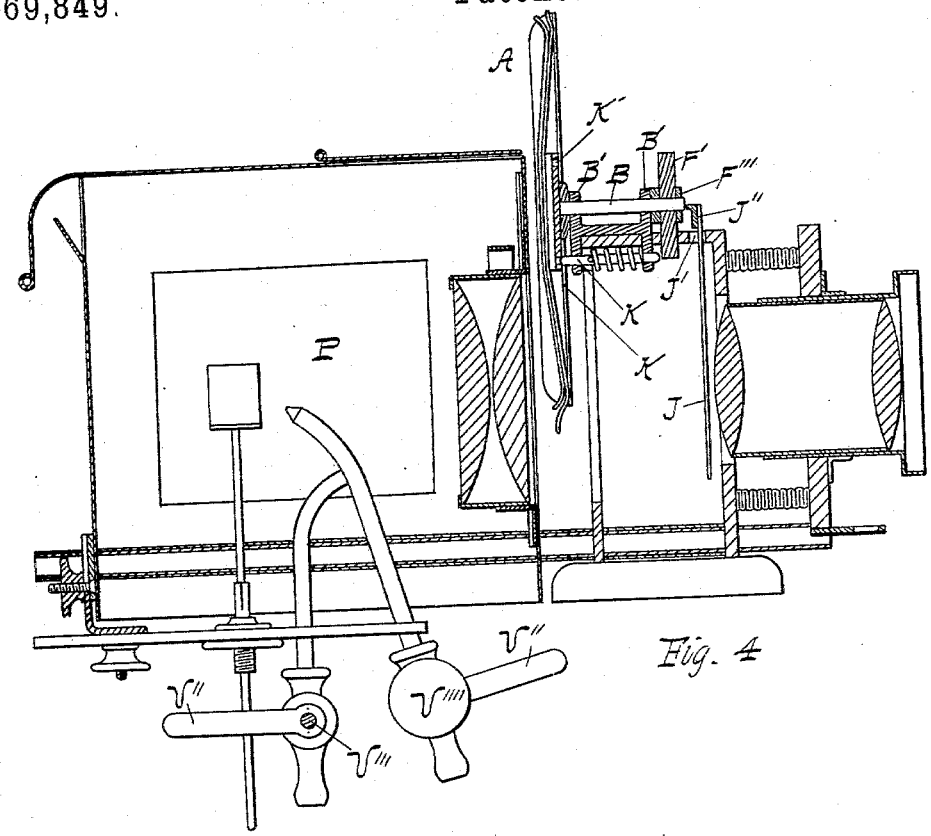
Figure 5:
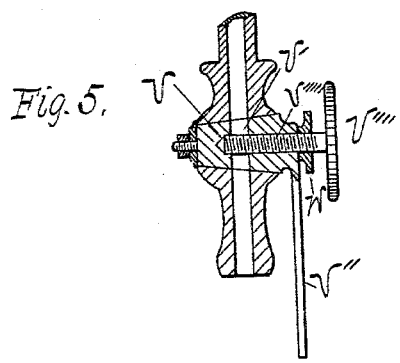

In the drawings, Figure 1 is a perspective view of a complete lantern having my improved slide-carrier and mechanism. Fig. 2 is a plan view, partly in section, to show details and with hood or lamp-box omitted. Fig. 3 is a rear elevation of the slide-carrier and mechanism, looking forward. Fig. 4 is a longitudinal cross-section of the complete apparatus, showing also the use of my improved taps or valves; and Fig. 5 is a longitudinal section through one of these valves.

Throughout the figures like letters of reference indicate like parts.

I will first describe the slide-carrier apparatus.

At A is shown the slide-carrier, in the form of a frame of light metal or other suitable material, consisting of two sides or slide-holders and a central cross-piece, which together present, in front elevation, the appearance of an H. Each slide-holder is suitably formed for receiving and holding the slides and suitable spring-fingers may be provided in any desired manner, as shown in the drawings. The carrier A is, therefore, a duplex carrier; that is to say, it is capable of holding two slides, one on each side of the cross-piece and placed foot to foot, for the carrier is mounted and pivoted to revolve in its vertical plane about an axis B, which is parallel with and vertically above the axis of the condenser. This axis B is preferably a horizontal rod which turns in suitable bearings B', suitably fixed upon the lantern.

I have not shown the slides in the carrier because the details of the carrier are more clearly presented without the slides. As shown in Fig. 1, only the upper holder of the carrier is visible. This is ready to receive a new slide while the lower slide is being exhibited. This will be apparent from Fig. 4. The carrier is held firmly in position by means of the spring rod or bolt K, which enters into either of the two holes K' of the carrier and locks it. The spring-bolt K has a rounded or conical head, so that when the carrier is turned by means of its lever, which will be presently described, the bolt K is forced out of its hole and permits the rotation of the carrier. When a slide has been exhibited, a new slide is inserted in the upper holder of the carrier and the carrier is then ready to be rotated one hundred and eighty degrees, which will bring the new slide into the field and remove the slide just exhibited from the field. In short the two slides reverse positions and change places, so that while one slide is being exhibited the preceding slide may be conveniently removed from the holder and a new slide slipped into place. During the rotation of the carrier the lantern is either closed or partially obscured by means of an opaque or partially opaque screen or dissolver J, which may with advantage be formed of semitransparent celluloid. This dissolver is dropped to the position shown in Fig. 4 just before the rotation of the carrier commences, and when it is rotated one-half revolution the dissolver is again raised. The mechanism by which this operation is performed is as follows: Upon the shaft B is mounted a ratchet F', which is turned by hand-lever F. This lever F is of the forked form clearly shown in Fig. 1. The shaft B passes through the forks of the lever and forms the fulcrum of the lever.

I is a spring tooth or bolt mounted and working in the lever (see Figs. 2 and 3) in position to engage the ratchet-wheel. The ratchet-wheel F' has two teeth when there are two holders in the carrier A; but it will be understood that the carrier is not limited to the duplex form for holding two plates and that the number of teeth of the ratchet F' must correspond with the number of holders in the carrier, for it is by means of the toothed ratchet F' that the shaft B is rotated and the slides successfully brought into proper position to be exhibited. When the lever F is turned from the position shown in Fig. 1 to the extreme left-hand position, as shown in Figs. 2 and 3, the spring-bolt I drops into the notch behind one of the teeth of the ratchet F'. When the lever is then turned to the right one hundred and eighty degrees to the extreme right-hand position, the shaft B and ratchet F' are turned by the lever and cause the rotation of the carrier A, reversing the position of the two slide-holders and substituting the next slide for the slide just exhibited.

The dissolver J automatically coöperates in the proper manner with the motions of the carrier A in the following manner: The dissolver J is of the arc-shaped form clearly shown in Figs. 1 and 3. The dissolver extends through the slit J' in the top of the slide-box C and is mounted upon the supporting pivoted lever or arm J''. J''' is a spring-arm fixed at one end to the fork F'''', and therefore turning with the hand-lever F. The spring-arm J'''' carries a finger J''''', which coöperates with the lever J''. The lever J'' is of the angular cross-section clearly seen in Figs. 1 and 4, so that a flange is presented which projects toward the spring-finger J''''' and is engaged by the finger in certain positions. Supposing the dissolver J to be in its dropped position, as in Figs. 2, 3, and 4, and the hand-lever J to be in an extreme left-hand position, as shown in the same figures, the spring-finger J''''' is entirely clear of the lever J'', and the hand-lever H may be drawn to its extreme right-hand position without disturbing the dissolver J. It is by this throw of the lever F that the carrier A is turned in the manner described and the slides reversed in the lantern. As the lever F reaches its extreme right-hand position the spring-finger J''''' comes into contact with the incline J'''''', made in the upper face of the lever J''. As the hand-lever is turned down to its extreme right-hand position the spring-finger J''''' meets the incline J'''''' and is forced backward in a manner very similar to the ordinary door-latch and then springs out beneath the flange of the lever J''. The lever is then brought back to the left until it reaches the position shown in Fig. 1. The spring-finger J''''', sliding under the lever J'', quickly raises the lever J'' and withdraws the dissolver through its slit J' and exhibits the slide within the lantern. The position shown in Fig. 1 is therefore the position of the lantern during the exhibition of the picture, and when in this position the slide which has already been exhibited is presented in the upper holder of the carrier A in convenient position to be drawn therefrom and replaced by a new slide. After this is done the hand-lever may again be brought into operation to drop the dissolver and reverse the slides in the lantern. As the lever is turned to the left from the position in Fig. 1 the spring-finger J''''' travels along beneath and supports the lever J'', which carries the dissolver J. Presently, however, the spring-finger J''''' reaches the cut-away portion or end J'''''' of the flange on the lever J'', and leaves the lever free to fall and drop the dissolver into the position shown in Figs. 2, 3, and 4. During this motion of the lever to the left, the spring-bolt I slides over the smooth periphery of the ratchet F' until it reaches the extreme left-hand position, as shown in Figs. 2 and 3, where the spring-bolt I slips into the notch behind one of the teeth of the ratchet F' and enables the reverse or right-hand motion of the hand-lever F to rotate the plate-carrier A, as already described. The complete cycle of motions therefore commences in the position shown in Fig. 1, and consists of the motion of the handle to the extreme left, then to the extreme right, and then back toward the left to the position shown in Fig. 1. This simple motion of the hand-lever F, by means of the devices described, first drops the dissolving-screen J, then reverses the position of the slide-carrier A, and then raises the dissolver.

I will not describe the manner of mounting and adjusting the hood and lenses and other parts to form the lantern-frame, because this can be variously modified without affecting the operation of my invention.

The second part of my present invention is the regulator, valve, tap, or stop-cock, which may be employed in conjunction with my rotary slide-carrier to produce dissolving and other effects. Briefly stated, this improved valve enables the operator to carefully adjust and regulate his gas supply by means of a regulating-screw, and after that to turn the gas partially or wholly off and again on without affecting the regulation. The valve is shown in Figs. 4 and 5. V is the plug of the valve provided with the port V', extending through it. V'' is the valve-lever or handle by which the gas is turned on and off. Instead of requiring the careful adjustment of this handle V'' in order to regulate the supply, the plug V is bored out from its head through to the port and tapped out to receive the threaded pin V''', which is fitted or packed, so that no gas can escape, in any suitable manner. The end of the pin V''' may be conical and fit into a corresponding cavity in the side of the port, or the end may be half-round and accurately fit the cross-section of the port V'. The valve is opened wide by means of the handle V'', and then the gas supply through the port V' may be regulated to a nicety by adjusting the position of the nose or tip of the pin V''' by turning its knurled head V''''. The supply of gas may be then turned on and off by means of the handle V' without affecting the regulation of the supply as obtained by means of the regulator-screw V'''. A knurled jam-nut W may be used to lock the pin V''' in position against accidental displacement.

As it is desirable to be able to examine the slides and, if necessary, read notes to assist in the exhibition of the slides I provide a reading-lamp attachment to the hood, as follows: P is a door hinged to the side of the lantern-body by the side of the light. This door is opened to an angle of forty-five degrees to the side of the lantern-body and is provided with wings P', hinged to it. When the door is closed, the wings P' may be laid flat against the inner face of the door or flap P, so as not to project inward toward the light; but when the door P is opened to the angle shown the wings are turned down and prevent lateral dispersion of the light. The inner surface of the door deflects the light downward upon the book or other object held beneath it.

I have now set forth my invention in all its essential features, leaving to mechanical skill such variations and details as may be desired, because to set forth any such variations would obscure rather than make clear the more essential features of the invention.

I claim, however, and desire to secure by these Letters Patent of the United States, together with such modifications as may be made by mere skill in the art, and with such limitations as are expressed or by law implied in view of the related arts, as follows:

1. In combination with an optical lantern, the rotary slide-carrier adapted to hold two or more slides, a ratchet, hand-lever, and pawl, for turning the said carrier, and a dissolver or screen operated by means of the said hand-lever, substantially as set forth.

2. In combination in and with an optical lantern, the rotary slide-carrier adapted to hold two or more slides, a hand-lever and connections for turning the said carrier, and a dissolver or screen connected with and operated by means of the said hand-lever, substantially as set forth.

3. The improved valve and regulator having a plug V provided with a port V', a regulating-pin extending through the said plug into the said port, a lock or lock-nut between the said pin and the said plug, and means for turning the said pin, whereby the flow of gas may be regulated by turning the said pin and whereby when the said pin is locked the turning of the pin will turn the valve without interfering with the regulation of the pin in the valve, substantially as set forth.

In testimony whereof I have hereunto set my hand this 21st day of October, A. D. 1895.

SAMUEL WESLEY ALLEN.

In presence of—
DANIEL HAIGHT,
ROBERT COWARD.